United States Patent
Shuang et al.

(10) Patent No.: US 9,229,086 B2
(45) Date of Patent: Jan. 5, 2016

(54) SOUND SOURCE LOCALIZATION APPARATUS AND METHOD

(75) Inventors: Zhiwei Shuang, Beijing (CN); David S. McGrath, Rose Bay (AU); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 853 days.

(21) Appl. No.: 13/469,587

(22) Filed: May 11, 2012

(65) Prior Publication Data

US 2012/0308038 A1  Dec. 6, 2012

Related U.S. Application Data

(60) Provisional application No. 61/508,949, filed on Jul. 18, 2011.

(30) Foreign Application Priority Data

Jun. 1, 2011  (CN) .......................... 2011 1 0157737

(51) Int. Cl.
  *G01S 3/803* (2006.01)
  *H04R 3/00* (2006.01)
(52) U.S. Cl.
  CPC .................................... *G01S 3/8034* (2013.01)
(58) Field of Classification Search
  USPC ............. 381/92, 120, 122; 340/933; 701/300, 701/519; 367/127; 382/103
  See application file for complete search history.

(56) References Cited

U.S. PATENT DOCUMENTS

| | | | |
|---|---|---|---|
| 4,891,839 | A | 1/1990 | Scheiber |
| 5,857,026 | A | 1/1999 | Scheiber |
| 6,026,169 | A | 2/2000 | Fujimori |
| 6,850,496 | B1 | 2/2005 | Knappe |
| 2006/0204019 | A1 | 9/2006 | Suzuki |

(Continued)

FOREIGN PATENT DOCUMENTS

| | | |
|---|---|---|
| CN | 1703118 | 11/2005 |
| CN | 101595739 | 12/2009 |

(Continued)

OTHER PUBLICATIONS

Cheng, B., et al., "A Spatial Squeezing Approach to Ambisonic Audio Compression" Proc ICASSP 2008, Las Vegas, USA, Mar. 2008.

(Continued)

*Primary Examiner* — Duc Nguyen
*Assistant Examiner* — Yogeshkumar Patel

(57) ABSTRACT

Sound source localization apparatuses and methods are described. A frame amplitude difference vector is calculated based on short time frame data acquired through an array of microphones. The frame amplitude difference vector reflects differences between amplitudes captured by microphones of the array during recording the short time frame data. Similarity between the frame amplitude difference vector and each of a plurality of reference frame amplitude difference vectors is evaluated. Each of the plurality of reference frame amplitude difference vectors reflects differences between amplitudes captured by microphones of the array during recording sound from one of a plurality of candidate locations. A desired location of sound source is estimated based at least on the candidate locations and associated similarity. The sound source localization can be performed based at least on amplitude difference.

29 Claims, 6 Drawing Sheets

(56) References Cited

U.S. PATENT DOCUMENTS

| | | | |
|---|---|---|---|
| 2006/0239471 A1* | 10/2006 | Mao | H04R 1/406 381/92 |
| 2009/0015651 A1 | 1/2009 | Togami | |
| 2009/0115635 A1* | 5/2009 | Berger | G01H 3/08 340/943 |
| 2009/0296526 A1 | 12/2009 | Amada | |
| 2009/0323474 A1* | 12/2009 | Lin | G01S 3/8034 367/118 |
| 2010/0030554 A1 | 2/2010 | Nomura | |
| 2010/0039497 A1 | 2/2010 | Cutler | |
| 2010/0054483 A1 | 3/2010 | Mizuno | |
| 2010/0061558 A1 | 3/2010 | Faller | |

FOREIGN PATENT DOCUMENTS

| | | |
|---|---|---|
| CN | 101614803 | 12/2009 |
| JP | 2004-325284 | 12/2004 |
| JP | 2006-267444 | 10/2006 |
| JP | 2006-340391 | 12/2006 |
| WO | 9842161 | 9/1998 |
| WO | 2009153053 | 12/2009 |

OTHER PUBLICATIONS

Dibiase, Joseph Hector, "A High-Accuracy, Low-Latency Technique for Talker Localization in Reverberant Environments Using Microphone Arrays" Thesis, May 2000, Providence, Rhode Island.

Roy, R., et al., "ESPRIT—Estimation of Signal Parameters Via Rotational Invariance Techniques" IEEE Transactions on Acoustics, Speech and Signal Processing, vol. 37, No. 7, Jul. 1989, pp. 984-995.

Schmidt, Ralph O., "Multiple Emitter Location and Signal Parameter Estimation" IEEE Transactions on Antennas and Propagation, vol. AP 34, No. 3, Mar. 1986, pp. 276-280.

Shujau, M., et al. "Designing Acoustic Vector Sensors for Localisation of Sound Sources in Air" Proc. EUSIPCO 2009, Glasgow, Scotland, pp. 949-853, Aug. 2009.

* cited by examiner

SOUND SOURCE LOCALIZATION APPARATUS AND METHOD

CROSS REFERENCE TO RELATED APPLICATIONS

This application claims the benefit of priority to related, co-pending Chinese Patent Application number 201110157737.0 filed on 1 Jun. 2011 and U.S. Patent Application No. 61/508,949 filed on 18 Jul. 2011 entitled "Sound Source Localization Apparatus and Method" by Shuang, Zhiwei, et al. hereby incorporated by reference in its entirety.

TECHNICAL FIELD

The present invention relates generally to sound source localization. More specifically, embodiments of the present invention relate to apparatuses and methods for performing sound source localization through an array of microphones.

BACKGROUND

Examples of sound source localization include localizing sound sources using an array of microphones. For example, a method (SRP-PHAT algorithm) of performing sound source localization based on time difference (phase difference) between the signals of different microphones has been proposed in J. DiBiase, "A high-accuracy, low-latency technique for talker localization in reverberant environments", PhD thesis, Brown University, Providence R.I., USA, May 2000.

SUMMARY

According to an embodiment of the present invention, a method of performing sound source localization is provided. The method includes calculating a frame amplitude difference vector based on short time frame data acquired through an array of microphones, the frame amplitude difference vector reflecting differences between amplitudes captured by microphones of the array during recording the short time frame data; evaluating similarity between the frame amplitude difference vector and each of a plurality of reference frame amplitude difference vectors, each of the plurality of reference frame amplitude difference vectors reflecting differences between amplitudes captured by microphones of the array during recording sound from one of a plurality of candidate locations; and estimating a desired location of sound source based at least on the candidate locations and associated similarity.

According to another embodiment of the present invention, an apparatus for performing sound source localization is provided. The apparatus includes a vector calculator that calculates a frame amplitude difference vector based on short time frame data acquired through an array of microphones, the frame amplitude difference vector reflecting differences between amplitudes captured by microphones of the array during recording the short time frame data; a similarity evaluator which evaluates similarity between the frame amplitude difference vector and each of a plurality of reference frame amplitude difference vectors, each of the plurality of reference frame amplitude difference vectors reflecting differences between amplitudes captured by microphones of the array during recording sound from one of a plurality of candidate locations; and an estimator which estimates a desired location of sound source based at least on the candidate locations and associated similarity.

According to another embodiment of the present invention, a computer-readable medium having computer program instructions recorded thereon for enabling a processor to perform sound source localization is provided. The computer program instructions include means for calculating a frame amplitude difference vector based on short time frame data acquired through an array of microphones, the frame amplitude difference vector reflecting differences between amplitudes captured by microphones of the array during recording the short time frame data; means for evaluating similarity between the frame amplitude difference vector and each of a plurality of reference frame amplitude difference vectors, each of the plurality of reference frame amplitude difference vectors reflecting differences between amplitudes captured by microphones of the array during recording sound from one of a plurality of candidate locations; and means for estimating a desired location of sound source based at least on the candidate locations and associated similarity.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION

Figure 1:
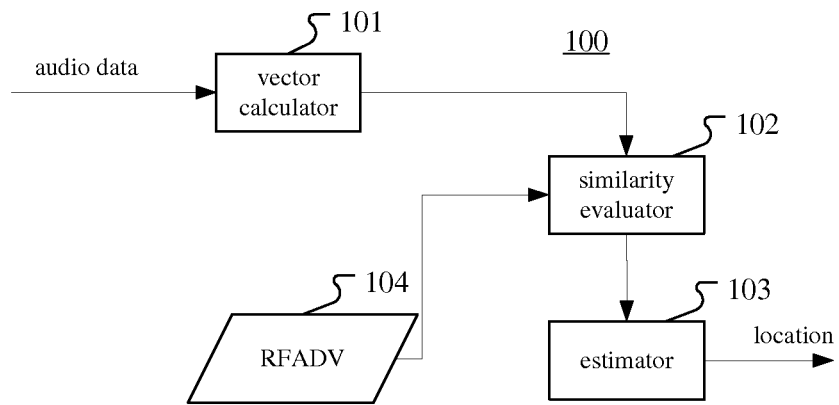
FIG. 1 is a block diagram illustrating an example apparatus for performing sound source localization according to an embodiment of the present invention.

The embodiments of the present invention are below described by referring to the drawings. It is to be noted that, for purpose of clarity, representations and descriptions about those components and processes known by those skilled in the art but unrelated to the present invention are omitted in the drawings and the description.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram illustrating an example apparatus 100 for performing sound source localization according to an embodiment of the present invention.

Apparatus 100 may be useful in various applications. In one application, apparatus 100 may detect speakers' location information in a meeting. This location information can be used to separate the speakers in meeting recording, or it can be used for spatial audio coding of the meeting.

As illustrated in FIG. 1, apparatus 100 includes a vector calculator 101, a similarity evaluator 102 and an estimator 103.

Vector calculator 101 is configured to calculate a frame amplitude difference vector (FADV) based on short time frame data acquired through an array of microphones. The frame amplitude difference vector reflects differences between amplitudes captured by microphones of the array during recording the short time frame data.

In general, due to diversity between distances from a sound source to different microphones of the array, or diversity between sensitivity of the microphones to sound signals from the sound source, amplitudes of the sound signals captured by the microphones from the same sound source are different. For different sound source locations, distributions of amplitude differences between the microphones can be different. For example, in case of an array of unidirectional microphones, or in case that the sound source is close to an array of omni-directional microphones, the distributions of the amplitude differences between the microphones can be significantly different. Based on this observation, the distributions of the amplitude differences between the microphones may be associated with different sound locations, at least those locations exhibiting this diversity. In this regard, it is possible to estimate whether a sound source is located at one of these locations according to this association, based on amplitude differences between the microphones introduced by the sound source.

In the following, an array of unidirectional microphones will be adopted as an example to describe the embodiments of the present invention.

Figure 2:
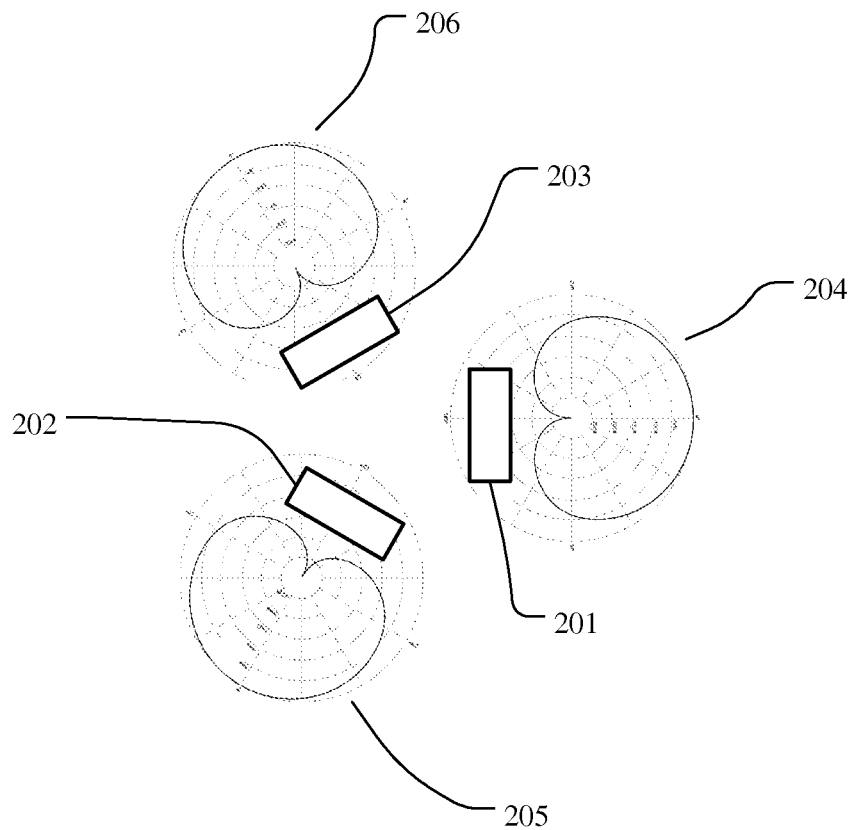
FIG. 2 depicts an example array of three cardioid microphones.

The unidirectional microphones may be cardioid microphones. FIG. 2 depicts an example array of three cardioid microphones 201, 202 and 203. Graphs 204, 205 and 206 illustrate directionality patterns of cardioid microphones 201, 202 and 203 respectively. Cardioid microphones 201, 202 and 203 are orientated in directions of 0 degrees, −120 degrees and −240 degrees respectively in a plane. Further, the distance between each pair of two microphones may be 1.15 cm. To facilitate description, this cardioid microphones array is named as CMA.

In general, the location of a sound source may refer to the angle of direction (DOA) of arrival or position of the sound source. In some cases, the distributions of amplitude differences between microphones for different positions along the DOA are substantially similar, and therefore, the DOA may be employed to measure the location. Depending on specific applications, the DOA may be represented with the azimuth angle of the sound source in a plane (named as horizontal plane) where the CMA is located. In this case, the audio localization problem is simplified to angle detection problem. However, it is possible to detect both the azimuth angle in the horizontal plane and the elevation angle in a vertical plane of source by adding one microphone facing upwards.

In the following, the azimuth angle of the sound source in the horizontal plane will be adopted as an example of the location.

It should be noted that various microphone arrays may be applied to the embodiments of the present invention as long as the distributions of amplitude differences between microphones for different locations can exhibit significant diversity.

The FADV reflects amplitude differences between microphones. In the following, the FADV is represented as a vector $(v_1, v_2, \ldots, v_M)$, where M represents the number of the microphones, and $v_i$ represents the amplitude captured by the i-th microphone. One skilled in the art can understand that other formats may be applied to the FADV to reflect amplitude differences between microphones. For example, $v_i$ in the vector $(v_1, v_2, \ldots, v_M)$ may represent the amplitude difference relative to the amplitude captured by a certain microphone. For another example, the FADV may be represented as a vector $(d_{1,1}, \ldots, d_{1,M}, d_{2,2}, \ldots, d_{2,M}, \ldots, d_{M-1,M})$, where M represents the number of the microphones, and $d_{i,j}$ represents the difference of amplitudes captured by the i-th microphone and the j-th microphone.

The short time frame data may be extracted from audio data stream pre-recorded through the array or recorded through the array in real time. Further, a window may be multiplied on the short time frame data. The window may be hamming window, hanning window, etc. Assuming that the short time frame contains N samples and the number of microphone is M, the short time frame data can be stored as a matrix X with M rows and N columns, where X(n,m) corresponds to the n-th sample of the m-th microphone.

$$X = \begin{bmatrix} x_{1,1} & x_{1,2} & \ldots & x_{1,N} \\ x_{2,1} & x_{2,2} & \ldots & x_{2,N} \\ \vdots & \vdots & & \vdots \\ x_{M,1} & x_{M,2} & \ldots & x_{M,N} \end{bmatrix}.$$

The value of N may be determined based on the sampling rate and expected time length of a short time frame:

N=time_length×sample_rate

Adjacent short time frames may or may not overlap with each other.

The value of N and whether to use overlapped short time frame is dependent on applications' requirement on time resolution and computation complexity. A larger N usually means more accurate estimation with more data, but lower time resolution if there is no overlapped data between adjacent short time frames. The time resolution can be increased by using overlapped data between adjacent short time frames. But using overlapped data between adjacent short time frames may increase the computation complexity. If Fast Fourier transform (FFT) is performed, N preferably belongs to a set expressed as $\{2^k, k=1, 2, \ldots\}$.

As an example, in one implementation, N=32768 is assumed for CMA when the sampling rate is 48 KHz.

Calculating the FADV

There are multiple methods to calculate the FADV. The methods may be classified into energy-based and eigenvector-based. The methods may also be classified into ones based on time domain sample values and ones based on frequency domain parameters. Specifically, the FADV may be calculated based on average amplitude on respective channels in the short time frame data, or based on eigenvector analysis on a covariance matrix including time domain sample values of respective channels in the short time frame data (i.e., portions corresponding to respective microphones in the short time frame data), or based on average amplitude on frequency domain of respective channels in the short time frame data, or based on eigenvector analysis on spectral parameters of respective channels in the short time frame data.

Method Based on Energy and Time Domain Sample Values

This method calculates the FADV directly based on the short-time average amplitudes of the channels (i.e., audio data recorded through respective microphones). That is to say, the FADV is calculated based on average amplitude on respective channels in the short time frame data.

First, the root mean square $ampf_m(\theta)$ of each channel m of one short time frame is calculated, and then a vector $(ampf_1(\theta), ampf_2(\theta), \ldots, ampf_M(\theta))$ is obtained, where $$ampf_m(\theta) = \sqrt{\frac{\sum_{n=1}^{N} X(m,n)^2}{N}}$$

where θ represents a desired location of the sound source.

To facilitate comparison with reference frame amplitude difference vector (RFADV) (to be described later), preferably, a normalization of root mean square (RMS) is performed on this vector to obtain the FADV $ampf(\theta)$:

$$ampf(\theta) = \frac{(ampf_1(\theta), ampf_2(\theta), \ldots, ampf_M(\theta))}{\sqrt{\begin{array}{c} ampf_1(\theta) \times ampf_1(\theta) + ampf_2(\theta) \times \\ ampf_2(\theta) + \ldots + ampf_M(\theta) \times ampf_M(\theta) \end{array}}}$$

Method Based on Eigenvector and Time Domain Sample Values

According to this method, the FADV is calculated based on eigenvector analysis on a covariance matrix including time domain sample values of respective channels in the short time frame data. First, the covariance matrix CovX of the short time frame data X is calculated by $$CovX = X*X',$$

where asterisk operator (*) means to perform a convolution operation, and apostrophe operator (') means to perform a complex conjugate transpose. For real value matrix or vector, apostrophe operator (') means to perform a transpose.

Then, the largest eigenvector of the covariance matrix is calculated as the FADV by eigendecomposition.

Method Based on Energy and Frequency Domain Parameters

According to this method, the FADV is calculated as an average amplitude on frequency domain of respective channels in the short time frame data. The frequency domain of FFT can be divided into a number W of frequency bins $B_i$, $i=1, \ldots, W$, where frequencies covered by frequency bin $B_i$ are lower than that covered by frequency bin $B_j$ if $i<j$. If it is known that some frequency bins may be affected by noise, it is possible to exclude the noisy frequency bins and only use a set of other frequency bins to calculate the FADV. For example, it is possible to exclude low frequency bins and high frequency bins to reduce the influence of low frequency noise and high frequency noise.

It is assumed that a set BU of L frequency bins to be used in calculating the FADV is denoted as BU={Bin(1), Bin(2), Bin(L)}, where Bin(i) $\in \{B_1, \ldots, B_W\}$. If one of the W frequency bins is completely covered by all the frequency bands which are determined or assumed as not being affected by noise, the bin may be included in the set BU. Alternatively, if one of the W frequency bins is completely or mainly covered by all the frequency bands which are determined or assumed as not being affected by noise, the bin may be included in the set BU.

In an example, it is determined that a frequency range from frequency nStartFrequency to frequency nEndFrequency are not affected by noise and is used to calculate the FADV. Let BU={Bin(1), Bin(2), Bin(L)}={$B_{StartBin}$, $B_{StartBin+1}$ ..., $B_{StartBin+L-1}$}, then the set BU can be determined by determining $$StartBin = ceil(nStartFrequency \times W/Samplerate)$$

$$EndBin = floor(nEndFrequency \times W/Samplerate)$$

where ceil(v) is a function returning a minimum one of all the integers greater than or equal to a value v, and floor(v) is a function returning a maximum one of all the integers smaller than or equal to a value v.

In one implementation, it is possible to set nStartFrequency=300 and nEndFrequency=8000.

First, N samples of each channel m is grouped into S sub-frames, and each sub-frame contains K samples.

$$[x_{m,1}, x_{m,2}, \ldots, x_{m,N}] \Rightarrow S_m = \begin{bmatrix} x_{m,1,1} & x_{m,2,1} & \cdots & x_{m,S,1} \\ x_{m,1,2} & x_{m,2,2} & \cdots & x_{m,S,2} \\ \vdots & \vdots & \cdots & \vdots \\ x_{m,1,K} & x_{m,2,K} & \cdots & x_{m,S,K} \end{bmatrix}$$

As a special case, the number S of the sub-frames can be set to 1, which means the spectral analysis is performed directly on the all N samples of one short time frame.

Then, spectral analysis is performed on each sub-frame to obtain parameters $F_m$ in spectral domain. For example, it is possible to apply FFT analysis on each sub-frame to obtain FFT parameters. Of course, other spectral analysis such as Mel-frequency cepstral coefficients (MFCCs) analysis, Subband Energy analysis in critical band or Mel band may also be employed to obtain other frequency domain parameters. It is also possible to employ complex spectral parameters such as complex FFT parameters or amplitude spectral parameters such as amplitude of FFT parameters.

$$F_m = fft(S_m) = \begin{bmatrix} f_{m,1,1} & f_{m,2,1} & \cdots & f_{m,S,1} \\ f_{m,1,2} & f_{m,2,2} & \cdots & f_{m,S,2} \\ \vdots & \vdots & \cdots & \vdots \\ f_{m,1,K} & f_{m,2,K} & \cdots & f_{m,S,K} \end{bmatrix}$$

where fft( ) represents FFT.

Then, frequency domain parameters of all the channels in each frequency bin Bin(i)$\in$ BU are calculated as $P_{Bin(i)}$.

$$P_{Bin(i)} = \begin{bmatrix} f_{1,1,Bin(i)} & f_{1,2,Bin(i)} & \cdots & f_{1,S,Bin(i)} \\ f_{2,1,Bin(i)} & f_{2,2,Bin(i)} & \cdots & f_{2,S,Bin(i)} \\ \vdots & \vdots & \vdots & \vdots \\ f_{M,1,Bin(i)} & f_{M,2,Bin(i)} & \cdots & f_{M,S,Bin(i)} \end{bmatrix}$$

Then, the amplitude $ampf_m(\theta)$ of each channel m of one short time frame is calculated by $$ampf_m(\theta) = \sqrt{\sum_{i=1}^{L} \sum_{s=1}^{S} |f_{m,s,Bin(i)}|^2}$$

where $|f_{m,sBin(i)}|$ means to calculate the absolute value of $f_{m,sBin(i)}$.

Then a vector ($ampf_1(\theta)$, $ampf_2(\theta)$, ..., $ampf_M(\theta)$) is obtained, where $\theta$ represents a desired location of the sound source.

Then, to facilitate comparison with RFADV (to be described later), preferably, a normalization of root mean square (RMS) is performed on this vector to obtain the FADV $ampf(\theta)$ by $$ampf(\theta) = \frac{(ampf_1(\theta), ampf_2(\theta), \ldots, ampf_M(\theta))}{\sqrt{ampf_1(\theta) \times ampf_1(\theta) + ampf_2(\theta) \times ampf_2(\theta) + \ldots + ampf_M(\theta) \times ampf_M(\theta)}}.$$

Method Based on Eigenvector and Frequency Domain Parameters

According to this method, the FADV is calculated based on eigenvector analysis on spectral parameters of respective channels in the short time frame data. As described on the foregoing, N samples of each channel m is grouped into S sub-frames, and each sub-frame contains K samples. In case that all the samples of the channel are grouped into sub-frames, it is possible to obtain the spectral parameters of each of the channels by performing spectral analysis on the sub-frames of the channel. For example, for matrix $P_{Bin(i)}$ containing frequency domain parameters of all the channels in each frequency bin Bin(i)∈ BU, a covariance matrix is calculated by:

$$Cov_{Bin(i)} = P_{Bin(i)} * P'_{Bin(i)}.$$

In one implementation, it is possible to obtain a first covariance matrix as a sum of second covariance matrices. Each of the second covariance matrices corresponds to respective one of used frequency bins and includes spectral parameters of all the sub-frames of all the channels for the respective used frequency bin. Accordingly, it is possible to calculate the FADV based on the eigenvector analysis on the first covariance matrix.

Specifically, the FADV can be calculated by finding the largest eigenvector based on the covariance matrices for the frequency bins. For example, it is possible to calculate a sum $Cov_{sum}$ of the covariance matrices of different bins by $$Cov_{sum} = \sum_{i=1}^{L} Cov_{Bin(i)}$$

and then calculate the largest eigenvector ampf(θ) of the sum $Cov_{sum}$ as the FADV.

As a special case, the number S of sub-frames for one short time frame equals to 1, that is to say, the grouping is not performed. This means that the spectral analysis is performed directly on the all N samples of one short time frame for each channel to obtain the spectral parameters of the channel. That is, frequency domain parameters of all the channels in all the frequency bin Bin(i) ∈ BU are calculated as $P_f$ by $$P_f = fft(X) = \begin{bmatrix} f_{1,Bin(1)} & f_{1,Bin(2)} & \cdots & f_{1,Bin(L)} \\ f_{2,Bin(1)} & f_{2,Bin(2)} & \cdots & f_{2,Bin(L)} \\ \vdots & \vdots & \vdots & \vdots \\ f_{M,Bin(1)} & f_{M,Bin(2)} & \cdots & f_{M,Bin(L)} \end{bmatrix}$$

In this case, the FADV is calculated as the largest eigenvector of a covariance matrix which includes spectral parameters of all the used frequency bins of all the channels. For example, for matrix $P_f$ containing frequency domain parameters of all the channels for all the frequency bins Bin(i)∈ BU, a covariance matrix is calculated by:

$$Cov_f = P_f * P'_f$$

and then the largest eigenvector ampf(θ) of the covariance matrix $Cov_f$ is calculated as the FADV.

In another implementation, it is possible to calculate the FADV by averaging the largest eigenvectors of covariance matrices. Each of the covariance matrices corresponds to respective one of used frequency bins and includes spectral parameters of all the sub-frames of all the channels for the respective used frequency bin. For example, it is possible to calculate the largest eigenvector $ampf_{Bin(i)}$ of the covariance matrix $Cov_{Bin(i)}$ for each frequency bin Bin(i) and calculate the average of the eigenvectors as the FADV.

$$ampf = \frac{1}{L}\sum_{i=1}^{L} |ampf_{Bin(i)}|.$$

Calculating the FADV Adaptively

Further more, the FADV may be calculated in an adaptive way. That is to say, vector calculator 101 may be configured to calculate the FADV adaptively based on the short time frame data and its previous short time frame data.

In one implementation, it is possible to calculate the desired FADV adaptively by calculating a current FADV based on the short time frame data, and smoothing the current FADV and a historic FADV based on the previous short time frame data as the desired FADV. The desired FADV or the current FADV may be used as a historic FADV for the next desired FADV. For example, in case of having calculated the FADV $ampf_{curr}$ (current FADV) of a current short time frame with the method as described in the above, it is possible to calculate a smoothed FADV $ampf_{smooth}$ (desired FADV) by $$ampf_{smooth} = a*ampf_{curr} + (1-a)*ampf_{hist},$$

where $ampf_{hist}$ is the historic FADV obtained based on the previous short time frame data. For example, it is possible to use $ampf_{curr}$ or $ampf_{smooth}$ for the current short time frame as $ampf_{hist}$ for the next short time frame. a is a constant to adjust the importance of the FADV of the current short time frame.

In another implementation, it is possible to calculate the FADV according to an eigenvector-based method (based on time domain sample values or based on frequency domain parameters). In this case, it is possible to obtain the final covariance matrix (summed covariance matrix, covariance matrix for a used frequency bin, or covariance matrix for all the used frequency bins) for calculating an eigenvector based on the short time frame data by deriving a current covariance matrix based on the short time frame data, and smoothing the current covariance matrix and a historic covariance matrix based on the previous short time frame data as the final covariance matrix. The final covariance matrix for calculating an eigenvector based on the short time frame data or the current covariance matrix may be used as a historic covariance matrix for the next final covariance matrix. For example, it is possible to calculate the covariance matrix $Cov_{smooth}$ (final covariance matrix) based on data of the current short time frame and the previous short time frames, and calculate the FADV for the current short time frame based on the covariance matrix. As one example, it is possible to calculate the covariance matrix for eigenvector analysis of one frame by:

$$Cov_{smooth} = a*Cov_{curr} + (1-a)*Cov_{hist},$$

where $Cov_{curr}$ (current covariance matrix) is the covariance matrix calculated based on data of the current short time frame, $Cov_{hist}$ (historic covariance matrix) is the historic covariance matrix based on data of the previous short time frames. For example, it is possible to use $Cov_{curr}$ or $Cov_{smooth}$ as $Cov_{hist}$ for the next short time frame. a is a constant to adjust the importance of the covariance matrix of the current short time frame.

Returning to FIG. 1, similarity evaluator 102 is configured to evaluate similarity between the FADV and each of a plurality of RFADVs 104. Each of the plurality of RFADVs reflects differences between amplitudes captured by the microphones of the array during recording sound from one of a plurality of candidate locations.

For comparison with the FADV, the RFADVs have the same format as the FADV. Because each RFADV reflects the amplitude differences associated with one of the candidate locations, the RFADV is associated with the candidate locations. The term "candidate location" means that the sound source may locate at the location and originate the sound for the current short time frame at the location.

It is possible to assume an even probability distribution for all locations, and thus the candidate locations may include all the locations spaced at an even interval depending on the localizing resolution. Preferably, to reduce the computation complexity, the candidate location may be a subset of all the locations. The subset may be different in different scenarios based on a prior knowledge of the source location's probability distribution.

Various methods can be adopted to calculate the similarity between the FADV ampf and the RFADV ampr($\theta$). For example, it is possible to directly measure the similarity through a distance ampdis($\theta$) between the FADV and the RFADV. In this case, a larger distance means the lower similarity, and a smaller distance means the higher similarity. For another example, the similarity may be an inverse of the distance.

The distances can be implemented as Euclidean distance.

$$ampdis(\theta) = \|ampf - ampr(\theta)\| = \sqrt{\sum_{i=1}^{N}(ampf_i - ampr_i(\theta))^2}.$$

where $\theta$ represents a candidate location, $ampf_i$ and $ampr_i(\theta)$ represent the i-th dimension of the FADV ampf and the RFADV ampr($\theta$) respectively.

The distance ampdis($\theta$) can also be calculated based on inner product:

$$ampdis(\theta) = \frac{1}{const + \sum_{i=1}^{N} ampf_i \cdot ampr_i(\theta)}$$

where const is a constant to avoid division by a small number.

Estimator 103 is configured to estimate a desired location of sound source based at least on the candidate locations and associated similarity. For example, a RFADV having the highest similarity to the FADV may be found, and the candidate location associated with the RFADV may be estimated as the desired location of the sound source. Further, the desired location may be estimated with reference to an estimation result obtained through another sound source localization method, for example, a method based on time difference.

Figure 3:
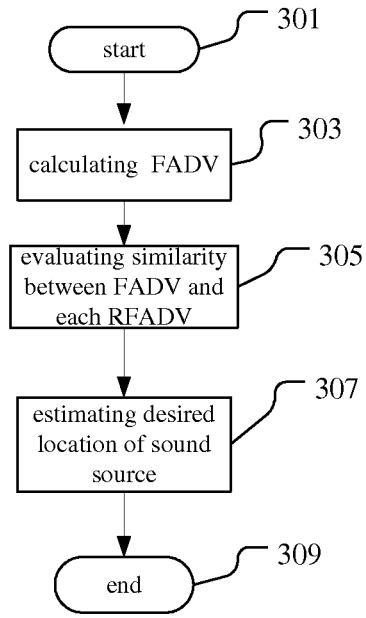
FIG. 3 depicts an example method of performing sound source localization according to an embodiment of the present invention.

FIG. 3 depicts an example method 300 of performing sound source localization according to an embodiment of the present invention.

As illustrated in FIG. 3, method 300 starts from step 301. At step 303, a FADV is calculated based on short time frame data acquired through an array of microphones. The FADV reflects differences between amplitudes captured by microphones of the array during recording the short time frame data. As described on the foregoing, there are multiple methods to calculate the FADV. The methods may be classified into energy-based and eigenvector-based. The methods may also be classified into ones based on time domain sample values and ones based on frequency domain parameters. Specifically, the FADV may be calculated based on average amplitude on respective channels in the short time frame data, or based on eigenvector analysis on a covariance matrix including time domain sample values of respective channels in the short time frame data, or based on average amplitude on frequency domain of respective channels in the short time frame data, or based on eigenvector analysis on spectral parameters of respective channels in the short time frame data.

As an example of calculating the FADV based on eigenvector analysis on spectral parameters of respective channels in the short time frame data, as described in the foregoing, the spectral parameters of each of the channels may be obtained by performing spectral analysis on a plurality of sub-frames of the channel, wherein all the samples of the channel are grouped into the sub-frames. In this case, a first covariance matrix may be obtained as a sum of second covariance matrices. Each of the second covariance matrices corresponds to respective one of used frequency bins and includes spectral parameters of all the sub-frames of all the channels for the respective used frequency bin. The FADV may be calculated based on the eigenvector analysis on the first covariance matrix. Alternatively, the FADV may be calculated by averaging the largest eigenvectors of covariance matrices. Each of the covariance matrices corresponds to respective one of used frequency bins and includes spectral parameters of all the sub-frames of all the channels for the respective used frequency bin.

As another example of calculating the FADV based on eigenvector analysis on spectral parameters of respective channels in the short time frame data, as described in the foregoing, the spectral parameters of each of the channels may be obtained by performing spectral analysis directly on all the samples of the channel. In this case, the FADV may be calculated as the largest eigenvector of a covariance matrix. The covariance matrix includes spectral parameters of all the used frequency bins of all the channels.

Further more, the FADV may be calculated adaptively based on the short time frame data and its previous short time frame data.

As an example, the FADV may be calculated adaptively by calculating a current frame amplitude difference vector based on the short time frame data, and smoothing the current frame amplitude difference vector and a historic frame amplitude difference vector calculated adaptively based on the previous short time frame data as the frame amplitude difference vector. The frame amplitude difference vector or the current frame amplitude difference vector may be used as a historic frame amplitude difference vector for the next frame amplitude difference vector.

As another example, the FADV may be calculated according to an eigenvector-based method, and the final covariance matrix for calculating an eigenvector based on the short time frame data may be obtained by deriving a current covariance matrix based on the short time frame data, and smoothing the current covariance matrix and a historic covariance matrix for calculating an eigenvector based on the previous short time frame data as the final covariance matrix. The final covariance matrix for calculating an eigenvector based on the short time frame data or the current covariance matrix may be used as the historic covariance matrix for the next final covariance matrix.

At step 305, similarity between the FADV and each of a plurality of RFADVs is evaluated. Each of the plurality of RFADVs reflects differences between amplitudes captured by microphones of the array during recording sound from one of a plurality of candidate locations.

At step 307, a desired location of sound source is estimated based at least on the candidate locations and associated similarity.

At step 309, the method ends.

Generation of RFADVs

Figure 4:
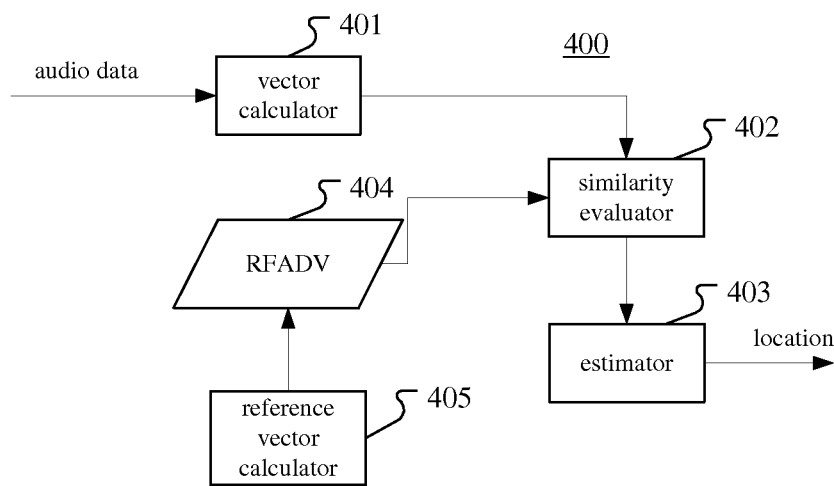
FIG. 4 is a block diagram illustrating an example apparatus for performing sound source localization according to an embodiment of the present invention.

FIG. 4 is a block diagram illustrating an example apparatus 400 for performing sound source localization according to an embodiment of the present invention.

As illustrated in FIG. 4, apparatus 400 includes a vector calculator 401, a similarity evaluator 402, an estimator 403 and a reference vector calculator 405. Vector calculator 401, similarity evaluator 402 and estimator 403 have the same function as vector calculator 101, similarity evaluator 102 and estimator 103, and will not be described in detail hereafter.

Reference vector calculator 405 may be configured to calculate the RFADVs based on audio data obtained by capturing sound originated from the candidate locations respectively through the array. In this case, for each candidate location θ, a reference amplitudes $r_m(\theta)$ of each microphone m is obtained by placing a sound source with a fixed energy at the location θ and measuring the average amplitude of the microphone m. Accordingly, a vector $(r_1(\theta), r_2(\theta), \ldots, r_M(\theta))$ is obtained. To facilitate comparison with the FADV, preferably, a normalization of root mean square (RMS) is performed on the vector. Then the RFADV ampr(θ) for the candidate location θ can be calculated by:

$$ampr(\theta) = \frac{(r_1(\theta), r_2(\theta), \ldots, r_M(\theta))}{\sqrt{r_1(\theta) \times r_1(\theta) + r_2(\theta) \times r_2(\theta) + \ldots + r_M(\theta) \times r_M(\theta)}}.$$

Alternatively, reference vector calculator 405 may also be configured to calculate the RFADVs based on sensitivity of the microphones of the array to sound originated from the candidate locations. For example, the sensitivity of a microphone to sound originated from locations can be defined through directionality pattern of the microphone. Accordingly, the RFADVs can be estimated according to the directionality pattern of the microphones.

For example, in case of the CMA, when the sound source is placed at location θ and no noise is present, the theoretical amplitude of microphone 201, 202 and 203 (see FIG. 2) can be estimated according to their cardioid directionality pattern by $$r_1(\theta) = 0.5 + 0.5\cos(\theta)$$

$$r_2(\theta) = 0.5 + 0.5\cos\left(\theta + \frac{2}{3}\pi\right)$$

$$r_3(\theta) = 0.5 + 0.5\cos\left(\theta + \frac{4}{3}\pi\right)$$

Then for CMA, $r_1(\theta) \times r_1(\theta) + r_2(\theta) \times r_2(\theta) + r_3(\theta) \times r_3(\theta) = 1.15$ holds for all the locations.

Then the RFADV for location θ is $$ampr(\theta) = \frac{\left(0.5 + 0.5\cos(\theta), 0.5 + 0.5\cos\left(\theta + \frac{2}{3}\pi\right), \ldots, 0.5 + 0.5\cos\left(\theta + \frac{4}{3}\pi\right)\right)}{\sqrt{1.15}}.$$

Further, by considering the influence of noise, the reference amplitudes of microphones 201, 202 and 203 may be calculated by $$r_1(\theta) = 0.5 + 0.5\cos(\theta) + n_1(\theta)$$

$$r_2(\theta) = 0.5 + 0.5\cos\left(\theta + \frac{2}{3}\pi\right) + n_2(\theta)$$

$$r_3(\theta) = 0.5 + 0.5\cos\left(\theta + \frac{4}{3}\pi\right) + n_3(\theta),$$

where $n_1(\theta)$, $n_2(\theta)$ and $n_3(\theta)$ are assumed as noise's amplitudes on the microphones in case that the sound is from location θ.

Assuming that the noise is independent of the sound source's location and the noise level of three microphones is the same, $n_1(\theta)$, $n_2(\theta)$ and $n_3(\theta)$ are constant $n_0$. $n_0$ can be set based on an estimated noise level in specific application scenarios. $n_1(\theta)$, $n_2(\theta)$ and $n_3(\theta)$ can also be estimated by the signal noise ratio (SNR) of the recorded signals by the microphone $$SNR = \frac{P_{signal}}{P_{noise}} = \left(\frac{A_{signal}}{A_{noise}}\right)^2.$$

Then $$A_{noise} = \frac{1}{\sqrt{SNR}} A_{signal}.$$

Then $$r_1(\theta) = 0.5 + 0.5\cos(\theta) + \frac{1}{\sqrt{SNR}}$$

$$r_2(\theta) = 0.5 + 0.5\cos\left(\theta + \frac{2}{3}\pi\right) + \frac{1}{\sqrt{SNR}}$$

$$r_3(\theta) = 0.5 + 0.5\cos\left(\theta + \frac{4}{3}\pi\right) + \frac{1}{\sqrt{SNR}}.$$

Various methods can be used to estimate SNR. As one example, SNR can be estimated by using a voice activity detection algorithm to classify voice signal segment and noise segment of the recording of an omni-directional microphone, and then comparing the power of signal segment and the power of noise segment. Further, the SNR estimation can be done in runtime in an adaptive way to handle the change of SNR, and in response, the RFADVs will be updated accordingly.

Figure 5:
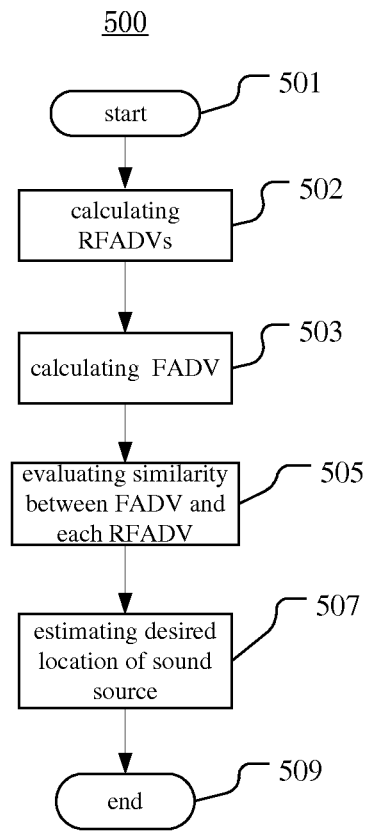
FIG. 5 depicts an example method of performing sound source localization according to an embodiment of the present invention.

FIG. 5 depicts an example method 500 of performing sound source localization according to an embodiment of the present invention.

As illustrated in FIG. 5, method 500 starts from step 501. At step 502, the RFADVs are acquired by capturing sound originated from the candidate locations respectively through the array. In this case, for each candidate location θ, a reference amplitudes $r_m(\theta)$ of each microphone m is obtained by placing a sound source with a fixed energy at the location θ and measuring the average amplitude of the microphone m. Alternatively, at step 502, the RFADVs may be calculated based on sensitivity of the microphones of the array to sound originated from the candidate locations.

Steps 503, 505, 507 and 509 have the same function as step 303, 305, 307 and 309, and will not be described in detail herein.

Figure 6:
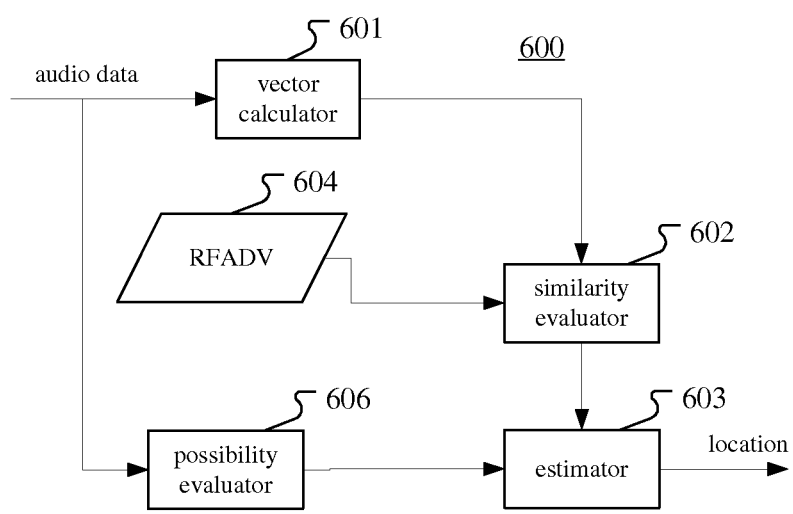
FIG. 6 is a block diagram illustrating an example apparatus for performing sound source localization according to an embodiment of the present invention.

FIG. 6 is a block diagram illustrating an example apparatus 600 for performing sound source localization according to an embodiment of the present invention.

As illustrated in FIG. 6, apparatus 600 includes a vector calculator 601, a similarity evaluator 602, an estimator 603 and a possibility evaluator 606. Vector calculator 601 and similarity evaluator 602 have the same function as vector calculator 101 and similarity evaluator 102, and will not be described in detail hereafter.

Possibility evaluator 606 is configured to evaluate possibility that each of a plurality of possible locations is the desired location according to an audio localization method based on time difference. Reference to the term "possible locations" is only for purpose of distinguishing from the candidate locations in the above embodiments based on amplitude difference. The possible locations are dependent on the method based on time difference. The term "possibility" is dependent on the measurement adopted by the method based on time difference to evaluate the closeness of possible locations to the desired location.

Estimator 603 is configured to estimate the desired location based on the candidate locations, their similarity, the possible locations and their possibility. Estimator 603 has two kinds of information to estimate the desired location. One is the candidate locations and their similarity, another is the possible locations and their possibility. Considering that one kind of information is a refinement to another, various policies may be adopted to estimate the desired location. For example, the estimation may be performed in similar to a voting problem.

Figure 7:
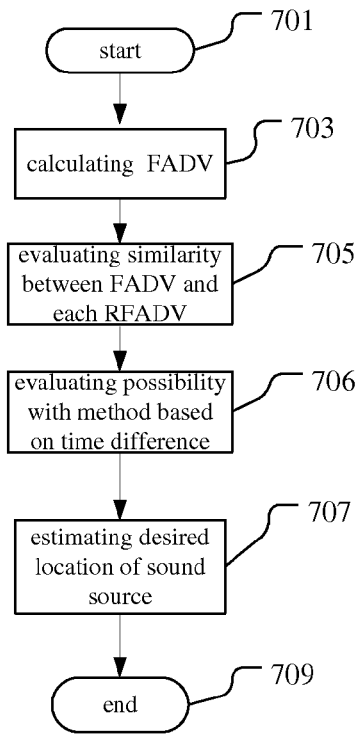
FIG. 7 depicts an example method of performing sound source localization according to an embodiment of the present invention.

FIG. 7 depicts an example method 700 of performing sound source localization according to an embodiment of the present invention.

As illustrated in FIG. 7, method 700 starts from step 701. Steps 703 and 705 have the same function as step 303 and 305, and will not be described in detail herein.

After step 705, method 700 proceeds to step 706. At step 706, possibility that each of a plurality of possible locations is the desired location is evaluated according to an audio localization method based on time difference.

At step 707, the desired location is estimated based on the candidate locations, their similarity, the possible locations and their possibility. Estimator 603 has two kinds of information to estimate the desired location.

Method 700 ends at step 709.

It should be noted that step 706 may be performed before step 705, or in parallel to step 705.

Figure 8:
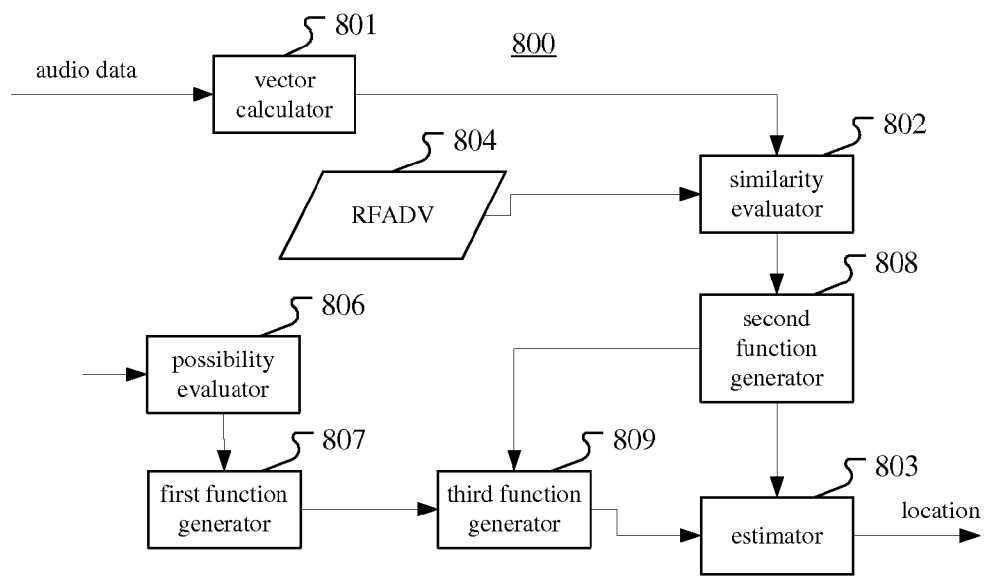
FIG. 8 is a block diagram illustrating an example apparatus for performing sound source localization according to an embodiment of the present invention.

FIG. 8 is a block diagram illustrating an example apparatus 800 for performing sound source localization according to an embodiment of the present invention.

As illustrated in FIG. 8, apparatus 800 includes a vector calculator 801, a similarity evaluator 802, an estimator 803, a possibility evaluator 806, a first function generator 807, a second function generator 808 and a third function generator 809. Vector calculator 801, similarity evaluator 802 and possibility evaluator 806 have the same function as vector calculator 601, similarity evaluator 602 and possibility evaluator 606, and will not be described in detail hereafter.

First function generator 807 is configured to derive a first probability function for estimating probability that all locations are the desired location based on the possible locations and their possibility. The first probability function may estimate the probability that the possible locations are the desired location. Furthermore, the first probability function may also estimate the probability that other locations are the desired location.

Various functions can be used to derive the first probability function of different locations based on the possibility.

For example, the possibility is measured by steered response power (SRP). One method is to directly use the steered response power $\tilde{P}_b^{PHAT}(\theta)$ corresponding to different locations $\theta$ as the first probability function $\text{prob}_{phase}(\theta)$ of different locations by $$\text{prob}_{phase}(\theta) = \tilde{P}_b^{PHAT}(\theta) \quad (1)$$

For another example, it is possible to derive the first probability function $\text{prob}_{phase}(\theta)$ of different locations $\theta$ based on the steered response power $\tilde{P}_b^{PHAT}(\theta)$ corresponding to different locations by $$\text{prob}_{phase}(\theta) = e^{-\frac{(1/\tilde{P}_b^{PHAT}(\theta))^2}{C}} \quad (2)$$

$$C = \frac{1}{L}\sum_{\theta=\theta_1}^{\theta_L} \left(1/\tilde{P}_b^{PHAT}(\theta)\right)^2 \quad (3)$$

Second function generator 808 is configured to derive a second probability function for estimating probability that all locations are the desired location based on the candidate locations and their similarity. The second probability function may estimate the probability that the candidate locations are the desired location. Furthermore, the second probability function may also estimate the probability that other locations are the desired location.

The second probability function can be estimated with various methods.

For example, the second probability function $\text{prob}_{amp}(\theta)$ of all locations $\theta$ can be derived based on the distances ampdis $(\theta)$ between the FADV and the RFADVs by $$\text{prob}_{amp}(\theta) = e^{-\frac{ampdis(\theta)^2}{C}} \quad (4)$$

$$C = \frac{1}{L}\sum_{\theta=\theta_1}^{\theta_L} ampdis(\theta)^2 \quad (5)$$

For another example, the second probability function $\text{prob}_{amp}(\theta)$ of all locations $\theta$ can be also estimated by $$\text{prob}_{amp}(\theta) = \frac{1}{ampdis(\theta)} \quad (6)$$

Third function generator 809 is configured to derive a combined probability function for estimating probability that all locations are the desired location based on the first probability function and the second probability function. The combined probability function may estimate the probability that the possible locations and the candidate locations are the desired location. Further more, the combined probability function may also estimate the probability that other locations are the desired location.

Various methods can be used to derive the combined probability function based on two probability functions. For example, it is possible to derive the combined probability function by multiplying the first and the second probability functions as follows:

$$prob_{comb}(\theta)=prob_{amp}(\theta)*prob_{phase}(\theta) \qquad (7)$$

Figure 10:
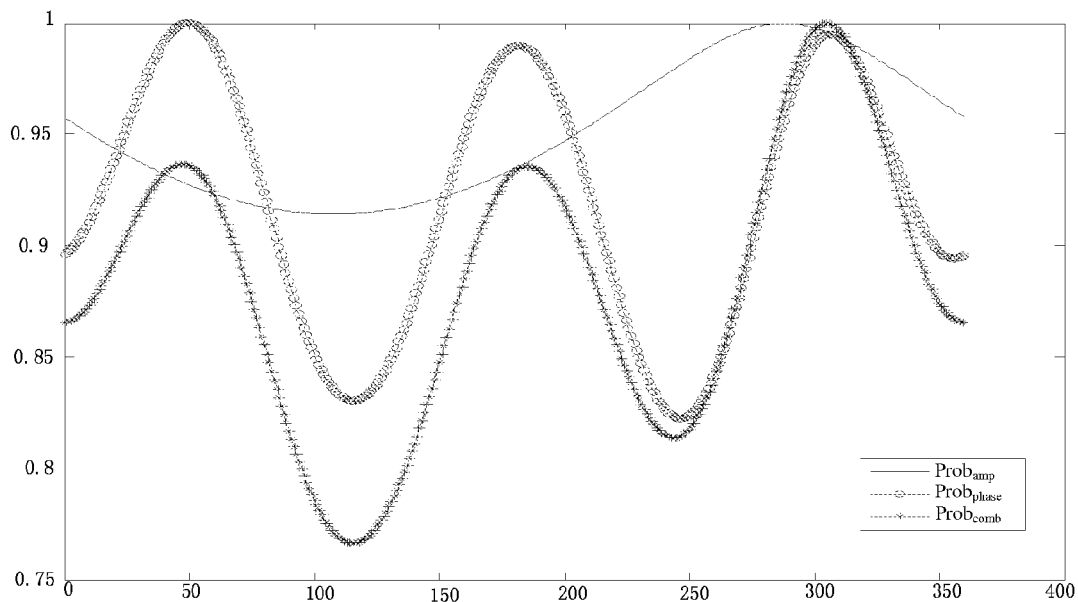
FIG. 10 depicts a graph illustrating an example of a combined probability function obtained by multiplying a first probability function and a second probability function.

FIG. 10 depicts a graph illustrating an example of a combined probability function $prob_{comb}(\theta)$ obtained by multiplying a first probability function $prob_{phase}(\theta)$ and a second probability function $prob_{amp}(\theta)$. In FIG. 10, the horizontal axis indicates locations, and the longitudinal axis indicates the probability that the locations are a desired location of sound source.

Estimator 803 is configured to estimate the location $\theta_{ampsrp}$ with the highest $prob_{comb}(\theta)$ as the desired location, i.e., $$\theta_{ampsrp} = \underset{\theta}{\operatorname{argmax}}(prob_{comb}(\theta))$$

The location $\theta_{ampsrp}$ is also called a combined estimation result.

In the example of FIG. 10, the sound source with the largest energy is located at 307 degrees. There are multiple angles with local maxima in the first probability functions, including 50 degrees, 182 degrees and 307 degrees, and the angle with the largest $prob_{phase}(\theta)$ is 50 degrees. The angle with the largest $prob_{amp}(\theta)$ is 288 degrees, which is close to the angle of the sound source but not accurate. $prob_{comb}(\theta)$ can be obtained by multiplying $prob_{amp}(\theta)$ with $prob_{phase}(\theta)$ The angle with the largest $prob_{comb}(\theta)$ is 305 degrees, which is very close to the real angle.

Preferably, estimator 803 is further configured to choose the closest one to the location having the largest combined probability from one or more peak locations in the first probability function or from one or more possible locations having the higher possibility.

For example, if the combined estimation result is close to the estimated location by the time difference based algorithm (i.e., possible locations having the higher possibility), the combined estimation result can be adjusted to the estimated location.

For example, if the combined estimation result is close to one potential location, i.e., one local maxima (peak) of SRP curve, the combined estimation result can be adjusted to that location.

As an example, it is possible to estimate a location $\theta_{phase}$ by $$\theta_{phase} = \underset{\theta}{\operatorname{argmax}}(prob_{phase}(\theta)).$$

Then $\theta_{ampsrp}$ is compared with $\theta_{phase}$.
If $\operatorname{diff}(\theta_{ampsrp}, \theta_{phase})$<threshold, then $\theta_{ampsrp}=\theta_{phase}$.
As another example, it is possible to calculate all the local maxima of SRP curves as $\theta_{phase\_1}, \theta_{phase\_2}, \ldots, \theta_{phase\_C}$. Then the local maxima $\theta_{phase\_c}$ closest to $\theta_{ampsrp}$ is found as the follows:
If $\operatorname{diff}(\theta_{ampsrp}, \theta_{phase\_c})$<threshold, then $\theta_{ampsrp}=\theta_{phase\_c}$.
In the example of FIG. 10, the local maxima $\theta_{phase\_c}$ closest to $\theta_{ampsrp}=305$ is 307 degrees. If using a threshold=10, $\theta_{ampsrp}$ will be refined as 307 degree.

Alternatively, the refinement can be performed by comparing the $\theta_{ampsrp}$ with the angle having the largest $prob_{phase}(\theta)$ and the angle having the largest $prob_{amp}(\theta)$. If $\theta_{ampsrp}$ is closer to the angle having the largest $prob_{phase}(\theta)$ than to the angle having the largest $prob_{amp}(\theta)$, $\theta_{ampsrp}$ can be refined as the angle having the largest $prob_{phase}(\theta)$.

Figure 9:
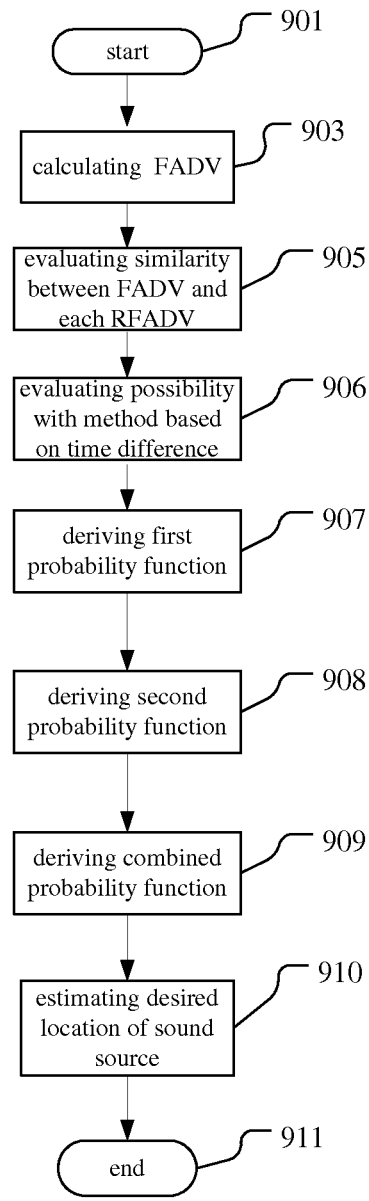
FIG. 9 depicts an example method of performing sound source localization according to an embodiment of the present invention.

FIG. 9 depicts an example method 900 of performing sound source localization according to an embodiment of the present invention.

As illustrated in FIG. 9, method 900 starts from step 901. Steps 903, 905 and 906 have the same function as steps 703, 705 and 706, and will not be described in detail herein.

After step 906, method 900 proceeds to step 907. At step 907, a first probability function for estimating probability that all locations are the desired location is derived based on the possible locations and their possibility.

At step 908, a second probability function for estimating probability that all locations are the desired location is derived based on the candidate locations and their similarity.

At step 909, a combined probability function for estimating probability that all locations are the desired location is calculated based on the first probability function and the second probability function.

At step 910, a location having the highest combined probability is estimated as the desired location, based on the combined probability function.

Method 900 ends at step 911.

It should be noted that step 907 may be executed at any time between steps 905 and 909, and step 908 may be executed at any time between steps 906 and 909.

Further, the first probability function may be derived by incorporating a first factor, and the second probability function may be derived by incorporating a second factor. The first factor and the second factor enable the combined probability function to be more sensitive to the similarity.

For example, Equation (1) may be adjusted to $$prob_{phase}(\theta)=R_{phase}+\tilde{P}_b^{PHAT}(\theta)$$

where a smaller $R_{phase}$ will make the final decision more dependent on the amplitude difference cues and vice versa. In one implementation for CMA, $R_{phase}=0$, then $prob_{phase}(\theta)=\tilde{P}_b^{PHAT}(\theta)$.

For example, Equation (3) may be adjusted to $$C = R_{amp} * \left( \frac{1}{L} \sum_{\theta=\theta_1}^{\theta_L} (1/\tilde{P}_b^{PHAT}(\theta))^2 \right)$$

where a smaller $R_{ampe}$ will make the final decision more dependent on the amplitude difference cues and vice versa. In one implementation for CMA, $R_{amp}=1$.

For example, Equation (5) may be adjusted to $$C = R_{amp} * \left( \frac{1}{L} \sum_{\theta=\theta_1}^{\theta_L} ampdis(\theta)^2 \right)$$

where $R_{amp}$ is a constant to adjust the probability function. A smaller $R_{amp}$ will make the probability function more sensitive to the distances between the FADV and RFADVs. Since this probability function is used to model the angle estimation result by another method, a smaller $R_{amp}$ can make the final decision more dependent on the amplitude difference cues and vice versa. In one implementation for CMA, $R_{amp}=3$.

For example, Equation (6) may be adjusted to $$prob_{amp}(\theta) = \frac{1}{R_{amp} + ampdis(\theta)}$$

Similarly, a smaller $R_{amp}$ will make the final decision more dependent on the amplitude difference cues and vice versa. In one implementation for CMA, $R_{amp}=6$.

In a modification to the embodiments of FIG. 8 and FIG. 9, third function generator 809 (step 909) and one of first function generator 807 (step 907) and second function generator 808 (step 908) may be omitted. In this case, another of first function generator 807 (step 907) and second function generator 808 (step 908) may derive a probability function for estimating probability that all locations are the desired location based on the possible locations and their possibility, or based on the candidate locations and their similarity. Accordingly, estimator 803 (step 910) is further configured to choose one having the highest probability based on the probability function from one or more of the candidate locations having the higher similarity, or from one or more of the possible locations having the higher possibility.

For example, a time difference based algorithm (such as SRP) returns all the angles with a local maxima value in steered response power curve for all angles while an amplitude difference based algorithm returns probability function. Then the probability function's values on the returned angles by SRP-PHAT are compared, and the angle with the largest probability is chosen as the final estimated angle.

In the example of FIG. 10, there are multiple angles with local maxima in the SRP-PHAT including 50 degrees, 182 degrees and 307 degrees, The $prob_{amp}(\theta)$ on 307 degrees is larger than the $prob_{amp}(\theta)$ on 50 degrees, 182 degrees, thus 307 degrees is chosen as final estimated angle.

In a further example of the embodiments of FIG. 6 and FIG. 7, estimator 603 (step 707) is further configured to find a pair of the candidate location having the higher similarity and the possible location having the higher possibility, which are closest to each other, and choose one of the pair of the candidate location and the possible location as the desired location.

In the example of FIG. 10, there are multiple angles with local maxima in the SRP-PHAT including 50 degrees, 182 degrees and 307 degrees. The angle with the smallest distance between the frame amplitude difference vector and reference amplitude difference vectors is 288 degrees, which is returned by the amplitude difference based algorithm. The SRP candidate closest to the candidate provided by amplitude difference based algorithm is 307 degrees, which is chosen as the final estimated angle.

Figure 11:
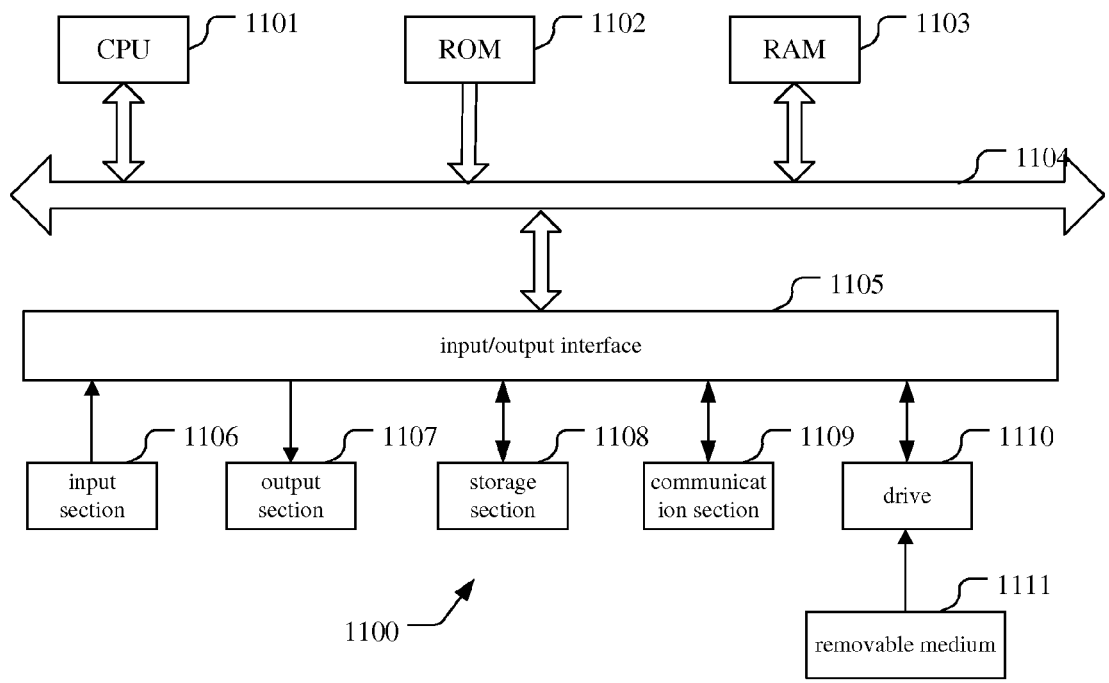
FIG. 11 is a block diagram illustrating an exemplary system for implementing aspects of the present invention.

FIG. 11 is a block diagram illustrating an exemplary system for implementing the aspects of the present invention.

In FIG. 11, a central processing unit (CPU) 1101 performs various processes in accordance with a program stored in a read only memory (ROM) 1102 or a program loaded from a storage section 1108 to a random access memory (RAM) 1103. In the RAM 1103, data required when the CPU 1101 performs the various processes or the like is also stored as required.

The CPU 1101, the ROM 1102 and the RAM 1103 are connected to one another via a bus 1104. An input/output interface 1105 is also connected to the bus 1104.

The following components are connected to the input/output interface 1105: an input section 1106 including a keyboard, a mouse, or the like; an output section 1107 including a display such as a cathode ray tube (CRT), a liquid crystal display (LCD), or the like, and a loudspeaker or the like; the storage section 1108 including a hard disk or the like; and a communication section 1109 including a network interface card such as a LAN card, a modem, or the like. The communication section 1109 performs a communication process via the network such as the internet.

A drive 1110 is also connected to the input/output interface 1105 as required. A removable medium 1111, such as a magnetic disk, an optical disk, a magneto-optical disk, a semiconductor memory, or the like, is mounted on the drive 1110 as required, so that a computer program read therefrom is installed into the storage section 1108 as required.

In the case where the above-described steps and processes are implemented by the software, the program that constitutes the software is installed from the network such as the internet or the storage medium such as the removable medium 1111.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The following embodiments are described.

1. A method of performing sound source localization, comprising:

calculating a frame amplitude difference vector based on short time frame data acquired through an array of microphones, the frame amplitude difference vector reflecting differences between amplitudes captured by microphones of the array during recording the short time frame data;

evaluating similarity between the frame amplitude difference vector and each of a plurality of reference frame amplitude difference vectors, each of the plurality of reference frame amplitude difference vectors reflecting differences between amplitudes captured by microphones of the array during recording sound from one of a plurality of candidate locations;

estimating a desired location of sound source based at least on the candidate locations and associated similarity.

2. The method according to 1, further comprising:

evaluating a possibility that each of a plurality of possible locations is the desired location according to an audio localization method based on time difference, and wherein the estimating comprises estimating the desired location based on the candidate locations, the similarity, the possible locations and the possibility.

3. The method according to 2, further comprising:

deriving a first probability function for estimating probability that all locations are the desired location based on the possible locations and their possibility;

deriving a second probability function for estimating probability that all locations are the desired location based on the candidate locations and their similarity; and calculating a combined probability function for estimating probability that all locations are the desired location based on the first probability function and the second probability function, and wherein the estimating comprises estimating a location having the highest combined probability as the desired location, based on the combined probability function.

4. The method according to 3, wherein the estimating comprises choosing the closest one to the location having the largest combined probability from one or more peak locations in the first probability function or from one or more possible locations having the higher possibility.

5. The method according to 3, wherein the first probability function is derived by incorporating a first factor, and the second probability function is derived by incorporating a second factor, the first factor and the second factor enable the combined probability function to be more sensitive to the similarity.

6. The method according to 2, further comprising:
deriving a probability function for estimating probability that all locations are the desired location based on the possible locations and their possibility, or based on the candidate locations and their similarity; and
wherein the estimating comprises choosing one having the highest probability based on the probability function from one or more of the candidate locations having the higher similarity, or from one or more of the possible locations having the higher possibility.

7. The method according to 2, wherein the estimating comprises:
finding a pair of the candidate locations having the higher similarity and the possible location having the higher possibility, which are closest to each other; and
choosing one of the pair of the candidate locations and the possible location as the desired location.

8. The method according to one of 1 to 7, wherein the frame amplitude difference vector is calculated according to one of the following methods: energy-based, and eigenvector-based.

9. The method according to one of 1 to 8, wherein the frame amplitude difference vector is calculated according to one of the following methods: a method based on time domain sample values, and a method based on frequency domain parameters.

10. The method according to one of 1 to 9, wherein the frame amplitude difference vector is calculated according to one of the following methods:
calculating the frame amplitude difference vector based on average amplitude on respective channels in the short time frame data;
calculating the frame amplitude difference vector based on eigenvector analysis on a covariance matrix including time domain sample values of respective channels in the short time frame data; and
calculating the frame amplitude difference vector based on average amplitude on frequency domain of respective channels in the short time frame data.

11. The method according to one of 1 to 9, wherein the frame amplitude difference vector is calculated based on eigenvector analysis on spectral parameters of respective channels in the short time frame data.

12. The method according to 8 or 9 or 11, wherein the spectral parameters are of one of the following types: FFT parameters, Mel-frequency cepstral coefficients, and Subband Energy.

13. The method according to 8 or 9 or 11, wherein the spectral parameters are complex spectral parameters or amplitude spectral parameters.

14. The method according to 8 or 9 or 11, wherein the spectral parameters of each of the channels are obtained by performing spectral analysis on a plurality of sub-frames of the channel, wherein all the samples of the channel are grouped into the sub-frames.

15. The method according to 14, wherein a first covariance matrix is obtained as a sum of second covariance matrices, and wherein each of the second covariance matrices corresponds to respective one of used frequency bins and includes spectral parameters of all the sub-frames of all the channels for the respective used frequency bin, and
wherein the frame amplitude difference vector is calculated based on the eigenvector analysis on the first covariance matrix.

16. The method according to 14, wherein the frame amplitude difference vector is calculated by averaging the largest eigenvectors of covariance matrices, and wherein each of the covariance matrices corresponds to respective one of used frequency bins and includes spectral parameters of all the sub-frames of all the channels for the respective used frequency bin.

17. The method according to 8 or 9 or 11, wherein the spectral parameters of each of the channels are obtained by performing spectral analysis directly on all the samples of the channel, and
wherein the frame amplitude difference vector is calculated as the largest eigenvector of a covariance matrix, and wherein the covariance matrix includes spectral parameters of all the used frequency bins of all the channels.

18. The method according to one of 1 to 17, wherein the frame amplitude difference vector is calculated adaptively based on the short time frame data and its previous short time frame data.

19. The method according to 18, wherein the frame amplitude difference vector is calculated adaptively by
calculating a current frame amplitude difference vector based on the short time frame data, and
smoothing the current frame amplitude difference vector and a historic frame amplitude difference vector calculated adaptively based on the previous short time frame data as the frame amplitude difference vector, wherein the frame amplitude difference vector or the current frame amplitude difference vector is used as a historic frame amplitude difference vector for the next frame amplitude difference vector.

20. The method according to 18, wherein the frame amplitude difference vector is calculated according to an eigenvector-based method, and
wherein the final covariance matrix for calculating an eigenvector based on the short time frame data is obtained by
deriving a current covariance matrix based on the short time frame data, and
smoothing the current covariance matrix and a historic covariance matrix based on the previous short time frame data as the final covariance matrix, wherein the final covariance matrix for calculating an eigenvector based on the short time frame data or the current covariance matrix is used as a historic covariance matrix for the next final covariance matrix.

21. The method according to one of 1 to 20, further comprising:
acquiring the plurality of reference frame amplitude difference vectors by capturing sound originated from the candidate locations respectively through the array.

22. The method according to one of 1 to 20, further comprising:

calculating the plurality of reference frame amplitude difference vectors based on sensitivity of the microphones of the array to sound originated from the candidate locations.

23. The method according to one of 1 to 22, wherein the array comprises three cardioid microphones which are orientated in directions of 0 degree, −120 degree and −240 degree respectively in a plane.

24. An apparatus for performing sound source localization, comprising:

a vector calculator that calculates a frame amplitude difference vector based on short time frame data acquired through an array of microphones, the frame amplitude difference vector reflecting differences between amplitudes captured by microphones of the array during recording the short time frame data;

a similarity evaluator which evaluates similarity between the frame amplitude difference vector and each of a plurality of reference frame amplitude difference vectors, each of the plurality of reference frame amplitude difference vectors reflecting differences between amplitudes captured by microphones of the array during recording sound from one of a plurality of candidate locations;

an estimator which estimates a desired location of sound source based at least on the candidate locations and associated similarity.

25. The apparatus according to 24, further comprising:

a possibility evaluator which evaluates possibility that each of a plurality of possible locations is the desired location according to an audio localization method based on time difference, and wherein the estimator is further configured to estimate the desired location based on the candidate locations, the similarity, the possible locations and the possibility.

26. The apparatus according to 25, further comprising:

a first function generator which derives a first probability function for estimating probability that all locations are the desired location based on the possible locations and their possibility;

a second function generator which derives a second probability function for estimating probability that all locations are the desired location based on the candidate locations and their similarity; and a third function generator which derives a combined probability function for estimating probability that all locations are the desired location based on the first probability function and the second probability function, and wherein the estimator is further configured to estimate a location having the highest combined probability as the desired location, based on the combined probability function.

27. The apparatus according to 26, wherein the estimator is further configured to choose the closest one to the location having the largest combined probability from one or more peak locations in the first probability function or from one or more peak locations in the second probability function.

28. The apparatus according to 26, wherein the first probability function is derived by incorporating a first factor, and the second probability function is derived by incorporating a second factor, the first factor and the second factor enable the combined probability function to be more sensitive to the similarity.

29. The apparatus according to 25, further comprising:

a function generator which derives a probability function for estimating probability that all locations are the desired location based on the possible locations and their possibility, or based on the candidate locations and their similarity, and wherein the estimator is further configured to choose one having the highest probability based on the probability function from one or more of the candidate locations having the higher similarity, or from one or more of the possible locations having the higher possibility.

30. The apparatus according to 25, wherein the estimator is further configured to find a pair of the candidate locations having the higher similarity and the possible location having the higher possibility, which are closest to each other, and choose one of the pair of the candidate location and the possible location as the desired location.

31. The apparatus according to one of 24 to 30, wherein the vector calculator is configured to calculate the frame amplitude difference vector according to one of the following methods: energy-based, and eigenvector-based.

32. The apparatus according to one of 24 to 31, wherein the vector calculator is configured to calculate the frame amplitude difference vector according to one of the following methods: a method based on time domain sample values, and a method based on frequency domain parameters.

33. The apparatus according to one of 24 to 32, wherein the vector calculator is configured to calculate the frame amplitude difference vector according to one of the following methods:

calculating the frame amplitude difference vector based on average amplitude on respective channels in the short time frame data;

calculating the frame amplitude difference vector based on eigenvector analysis on a covariance matrix including time domain sample values of respective channels in the short time frame data; and calculating the frame amplitude difference vector based on average amplitude on frequency domain of respective channels in the short time frame data.

34. The apparatus according to one of 24 to 32, wherein the vector calculator is configured to calculate the frame amplitude difference vector based on eigenvector analysis on spectral parameters of respective channels in the short time frame data.

35. The apparatus according to 31 or 32 or 34, wherein the spectral parameters are of one of the following types: FFT parameters, Mel-frequency cepstral coefficients, and Sub-band Energy.

36. The apparatus according to 31 or 32 or 34, wherein the spectral parameters are complex spectral parameters or amplitude spectral parameters.

37. The apparatus according to 31 or 32 or 34, wherein the vector calculator is configured to obtain the spectral parameters of each of the channels by performing spectral analysis on a plurality of sub-frames of the channel, wherein all the samples of the channel are grouped into the sub-frames.

38. The apparatus according to 37, wherein the vector calculator is configured to obtain a first covariance matrix as a sum of second covariance matrices, and wherein each of the second covariance matrices corresponds to respective one of used frequency bins and includes spectral parameters of all the sub-frames of all the channels for the respective used frequency bin, and wherein the vector calculator is configured to calculate the frame amplitude difference vector based on the eigenvector analysis on the first covariance matrix.

39. The apparatus according to 37, wherein the vector calculator is configured to calculate the frame amplitude difference vector by averaging the largest eigenvectors of covariance matrices, and wherein each of the covariance matrices corresponds to respective one of used frequency bins and includes spectral parameters of all the sub-frames of all the channels for the respective used frequency bin.

40. The apparatus according to 31 or 32 or 34, wherein the vector calculator is configured to obtain the spectral parameters of each of the channels by performing spectral analysis directly on all the samples of the channel, and wherein the vector calculator is configured to calculate the frame amplitude difference vector as the largest eigenvector of a covariance matrix, and wherein the covariance matrix includes spectral parameters of all the used frequency bins of all the channels.

41. The apparatus according to one 24 to 40, wherein the vector calculator is configured to calculate the frame amplitude difference vector adaptively based on the short time frame data and its previous short time frame data.

42. The apparatus according to 41, wherein the vector calculator is configured to calculate the frame amplitude difference vector adaptively by calculating a current frame amplitude difference vector based on the short time frame data, and smoothing the current frame amplitude difference vector and a historic frame amplitude difference vector based on the previous short time frame data as the frame amplitude difference vector, wherein the frame amplitude difference vector or the current frame amplitude difference vector is used as a historic frame amplitude difference vector for the next frame amplitude difference vector.

43. The apparatus according to 41, wherein the vector calculator is configured to calculate the frame amplitude difference vector according to an eigenvector-based method, and wherein the vector calculator is configured to obtain the final covariance matrix for calculating an eigenvector based on the short time frame data by deriving a current covariance matrix based on the short time frame data, and smoothing the current covariance matrix and a historic covariance matrix based on the previous short time frame data as the final covariance matrix, wherein the final covariance matrix for calculating an eigenvector based on the short time frame data or the current covariance matrix is used as a historic covariance matrix for the next final covariance matrix.

44. The apparatus according to one of 24 to 43, further comprising:

a reference vector calculator which calculates the plurality of reference frame amplitude difference vectors based on audio data obtained by capturing sound originated from the candidate locations respectively through the array.

45. The apparatus according to one of 24 to 43, further comprising:

a reference vector calculator which calculates the plurality of reference frame amplitude difference vectors based on sensitivity of the microphones of the array to sound originated from the candidate locations.

46. The apparatus according to one of 24 to 45, wherein the array comprises three cardioid microphones which are orientated in directions of 0 degrees, −120 degrees and −240 degrees respectively in a plane.

47. A computer-readable medium having computer program instructions recorded thereon for enabling a processor to perform sound source localization, the computer program instructions comprising:

means for calculating a frame amplitude difference vector based on short time frame data acquired through an array of microphones, the frame amplitude difference vector reflecting differences between amplitudes captured by microphones of the array during recording the short time frame data;

means for evaluating similarity between the frame amplitude difference vector and each of a plurality of reference frame amplitude difference vectors, each of the plurality of reference frame amplitude difference vectors reflecting differences between amplitudes captured by microphones of the array during recording sound from one of a plurality of candidate locations;

means for estimating a desired location of sound source based at least on the candidate locations and associated similarity.

48. The computer-readable medium according to 47, wherein the computer program instructions further comprises:

means for evaluating possibility that each of a plurality of possible locations is the desired location according to an audio localization method based on time difference, and wherein the means for estimating comprises means for estimating the desired location based on the candidate locations, the similarity, the possible locations and the possibility.

We claim:

1. A method of performing sound source localization, comprising:

providing a plurality of reference frame amplitude difference vectors, each of the plurality of reference frame amplitude difference vectors being associated with a respective candidate location of a plurality of different candidate locations and each of the plurality of reference frame amplitude difference vectors reflecting differences between amplitudes captured by microphones of an array of microphones during recording sound from a reference sound source located at the respective associated candidate location;

calculating a frame amplitude difference vector based on short time frame data acquired through the array of microphones, the frame amplitude difference vector reflecting differences between amplitudes captured by microphones of the array of microphones during recording the short time frame data including the recorded sound from a target sound source;

evaluating, for each of the plurality of reference frame amplitude difference vectors, a respective similarity between the frame amplitude difference vector and the respective reference frame amplitude difference vector; and estimating a desired location of the target sound source based at least on the plurality of candidate locations and their respective associated similarities.

2. The method according to claim 1, further comprising:

evaluating a possibility that each of a plurality of possible locations is the desired location according to an audio localization method based on time difference, and wherein the estimating comprises estimating the desired location based on the candidate locations, the associated similarities, the possible locations and the possibility.

3. The method according to claim 2, further comprising:

deriving a first probability function for estimating probability that all locations are the desired location based on the possible locations and their possibility;

deriving a second probability function for estimating probability that all locations are the desired location based on the candidate locations and their associated similarities; and calculating a combined probability function for estimating probability that all locations are the desired location based on the first probability function and the second probability function, and wherein the estimating comprises estimating a location having the highest combined probability as the desired location, based on the combined probability function.

4. The method according to claim 2, further comprising:
deriving a probability function for estimating probability that all locations are the desired location based on the possible locations and their possibility, or based on the candidate locations and their associated similarities; and
wherein the estimating comprises choosing one having the highest probability based on the probability function from one or more of the candidate locations having the higher similarity, or from one or more of the possible locations having the higher possibility.

5. The method according to claim 2, wherein the estimating comprises:
finding a pair of the candidate locations having the higher similarity and the possible location having the higher possibility, which are closest to each other; and
choosing one of the pair of the candidate locations and the possible location as the desired location.

6. The method according to claim 1, wherein the frame amplitude difference vector is calculated according to one of the following methods:
energy-based, and eigenvector-based.

7. The method according to claim 1, wherein the frame amplitude difference vector is calculated according to one of the following methods:
a method based on time domain sample values, and a method based on frequency domain parameters.

8. The method according to claim 1, wherein the frame amplitude difference vector is calculated according to one of the following methods:
calculating the frame amplitude difference vector based on average amplitude on respective channels in the short time frame data;
calculating the frame amplitude difference vector based on eigenvector analysis on a covariance matrix including time domain sample values of respective channels in the short time frame data; and
calculating the frame amplitude difference vector based on average amplitude on frequency domain of respective channels in the short time frame data.

9. The method according to claim 1, wherein the frame amplitude difference vector is calculated based on eigenvector analysis on spectral parameters of respective channels in the short time frame data.

10. The method according to claim 1, further comprising:
acquiring the plurality of reference frame amplitude difference vectors by capturing sound originated from the candidate locations respectively through the array.

11. The method according to claim 1, further comprising:
calculating the plurality of reference frame amplitude difference vectors based on sensitivity of the microphones of the array to sound originated from the candidate locations.

12. The method according to claim 1, wherein the array comprises three cardioid microphones which are orientated in directions of 0 degree, −120 degree and −240 degree respectively in a plane.

13. An apparatus for performing sound source localization, comprising:
a memory that provides a plurality of reference frame amplitude difference vectors, each of the plurality of reference frame amplitude difference vectors being associated with a respective candidate location of a plurality of different candidate locations and each of the plurality of reference frame amplitude difference vectors reflecting differences between amplitudes captured by microphones of an array of microphones during recording sound from a reference sound source located at the respective associated candidate location;
a vector calculator that calculates a frame amplitude difference vector based on short time frame data acquired through the array of microphones, the frame amplitude difference vector reflecting differences between amplitudes captured by microphones of the array of microphones during recording the short time frame data including the recorded sound from a target sound source;
a similarity evaluator which evaluates, for each of the plurality of reference frame amplitude difference vectors, a respective similarity between the frame amplitude difference vector and the respective reference frame amplitude difference vector; and
an estimator which estimates a desired location of the target sound source based at least on the plurality of candidate locations and their respective associated similarities.

14. The apparatus according to claim 13, further comprising:
a possibility evaluator which evaluates possibility that each of a plurality of possible locations is the desired location according to an audio localization method based on time difference, and
wherein the estimator is further configured to estimate the desired location based on the candidate locations, the associated similarities, the possible locations and the possibility.

15. The apparatus according to claim 14, further comprising:
a first function generator which derives a first probability function for estimating probability that all locations are the desired location based on the possible locations and their possibility,
a second function generator which derives a second probability function for estimating probability that all locations are the desired location based on the candidate locations and their associated similarities; and
a third function generator which derives a combined probability function for estimating probability that all locations are the desired location based on the first probability function and the second probability function, and
wherein the estimator is further configured to estimate a location having the highest combined probability as the desired location, based on the combined probability function.

16. The apparatus according to claim 15, wherein the estimator is further configured to choose the closest one to the location having the largest combined probability from one or more peak locations in the first probability function or from one or more possible locations having the higher possibility.

17. The apparatus according to claim 15, wherein the first probability function is derived by incorporating a first factor, and the second probability function is derived by incorporating a second factor, the first factor and the second factor enable the combined probability function to be more sensitive to the similarity.

18. The apparatus according to claim 14, further comprising:
a function generator which derives a probability function for estimating probability that all locations are the desired location based on the possible locations and their possibility, or based on the candidate locations and their associated similarities, and wherein the estimator is further configured to choose one having the highest probability based on the probability function from one or more of the candidate locations having the higher similarity, or from one or more of the possible locations having the higher possibility.

19. The apparatus according to claim 14, wherein the estimator is further configured to find a pair of the candidate location having the higher similarity and the possible location having the higher possibility, which are closest to each other, and choose one of the pair of the candidate location and the possible location as the desired location.

20. The apparatus according to claim 13, wherein the vector calculator is configured to calculate the frame amplitude difference vector according to one of the following methods: energy-based, and eigenvector-based.

21. The apparatus according to claim 13, wherein the vector calculator is configured to calculate the frame amplitude difference vector according to one of the following methods: a method based on time domain sample values, and a method based on frequency domain parameters.

22. The apparatus according to claim 13, wherein the vector calculator is configured to calculate the frame amplitude difference vector according to one of the following methods:
  calculating the frame amplitude difference vector based on average amplitude on respective channels in the short time frame data;
  calculating the frame amplitude difference vector based on eigenvector analysis on a covariance matrix including time domain sample values of respective channels in the short time frame data; and
  calculating the frame amplitude difference vector based on average amplitude on frequency domain of respective channels in the short time frame data.

23. The apparatus according to claim 13, wherein the vector calculator is configured to calculate the frame amplitude difference vector based on eigenvector analysis on spectral parameters of respective channels in the short time frame data.

24. The apparatus according to claim 13, wherein the vector calculator is configured to calculate the frame amplitude difference vector adaptively based on the short time frame data and its previous short time frame data.

25. The apparatus according to claim 13, further comprising:
  a reference vector calculator which calculates the plurality of reference frame amplitude difference vectors based on audio data obtained by capturing sound originated from the candidate locations respectively through the array.

26. The apparatus according to claim 13, further comprising:
  a reference vector calculator which calculates the plurality of reference frame amplitude difference vectors based on sensitivity of the microphones of the array to sound originated from the candidate locations.

27. The apparatus according to claim 13, wherein the array comprises three cardioid microphones orientated in directions of 0 degrees, −120 degrees and −240 degrees respectively in a plane.

28. A non-transitory computer-readable medium having computer program instructions recorded thereon for enabling a processor to perform sound source localization, the computer program instructions comprising:
  means for providing a plurality of reference frame amplitude difference vectors, each of the plurality of reference frame amplitude difference vectors being associated with a respective candidate location of a plurality of different candidate locations and each of the plurality of reference frame amplitude difference vectors reflecting differences between amplitudes captured by microphones of an array of microphones during recording sound from a reference sound source located at the respective associated candidate location;
  means for calculating a frame amplitude difference vector based on short time frame data acquired through the array of microphones, the frame amplitude difference vector reflecting differences between amplitudes captured by microphones of the array of microphones during recording the short time frame data including the recorded sound from a target sound source;
  means for evaluating, for each of the plurality of reference frame amplitude difference vectors, a respective similarity between the frame amplitude difference vector and of the respective reference frame amplitude difference vector; and
  means for estimating a desired location of the target sound source based at least on the plurality of candidate locations and their respective associated similarities.

29. The non-transitory computer-readable medium according to claim 28, wherein the computer program instructions further comprises:
  means for evaluating possibility that each of a plurality of possible locations is the desired location according to an audio localization method based on time difference, and
  wherein the means for estimating comprises means for estimating the desired location based on the candidate locations, the associated similarities, the possible locations and the possibility.

* * * * *